United States Patent [19]

Kluger et al.

[11] 4,332,928

[45] Jun. 1, 1982

[54] POLYAMINOPOLYAMIDES

[75] Inventors: Edward W. Kluger, Pauline; Calvin D. Welch, Greenville, both of S.C.

[73] Assignee: Milliken Research Corporation, Spartanburg, S.C.

[21] Appl. No.: 239,958

[22] Filed: Mar. 3, 1981

[51] Int. Cl.$^3$ ............................................. C08G 59/54
[52] U.S. Cl. .................................. 528/113; 528/116; 528/123; 528/365; 564/152; 564/156; 564/157; 564/144
[58] Field of Search ............... 528/113, 116, 123, 365; 564/152, 144, 156, 157; 260/346.73, 347.7

[56] References Cited

U.S. PATENT DOCUMENTS

| | | | |
|---|---|---|---|
| 2,371,104 | 3/1945 | Kienle et al. | 564/156 X |
| 3,382,261 | 5/1968 | Kittredge et al. | 528/123 X |
| 3,639,657 | 2/1972 | Moran et al. | 528/123 X |
| 3,799,909 | 3/1974 | Taylor | 528/123 X |
| 3,946,053 | 3/1976 | Robinson et al. | 564/160 X |

Primary Examiner—Earl A. Nielsen

Attorney, Agent, or Firm—H. William Petry; Terry T. Moyer

[57] ABSTRACT

Polyaminopolyamide compounds are provided which comprise the reaction product of at least one carboxylic acid anhydride selected from mono-, di-, and polyanhydrides with at least one polyamine of the formula:

$$H_2N—R—(NH_2)_x$$

in an amount of at least about 2 moles per mole of carboxylic acid anhydride group wherein R is selected from an aromatic group containing from about 13 to about 34 carbon atoms; a cycloalkyl group containing from about 13 to about 34 carbon atoms; and an alkyl group containing from about 9 to about 25 carbon atoms, which may further contain at least one heteroatom selected from oxygen, nitrogen, and sulfur; and x is an integer of from about 2 to about 9, preferably from about 2 to about 5.

9 Claims, 2 Drawing Figures

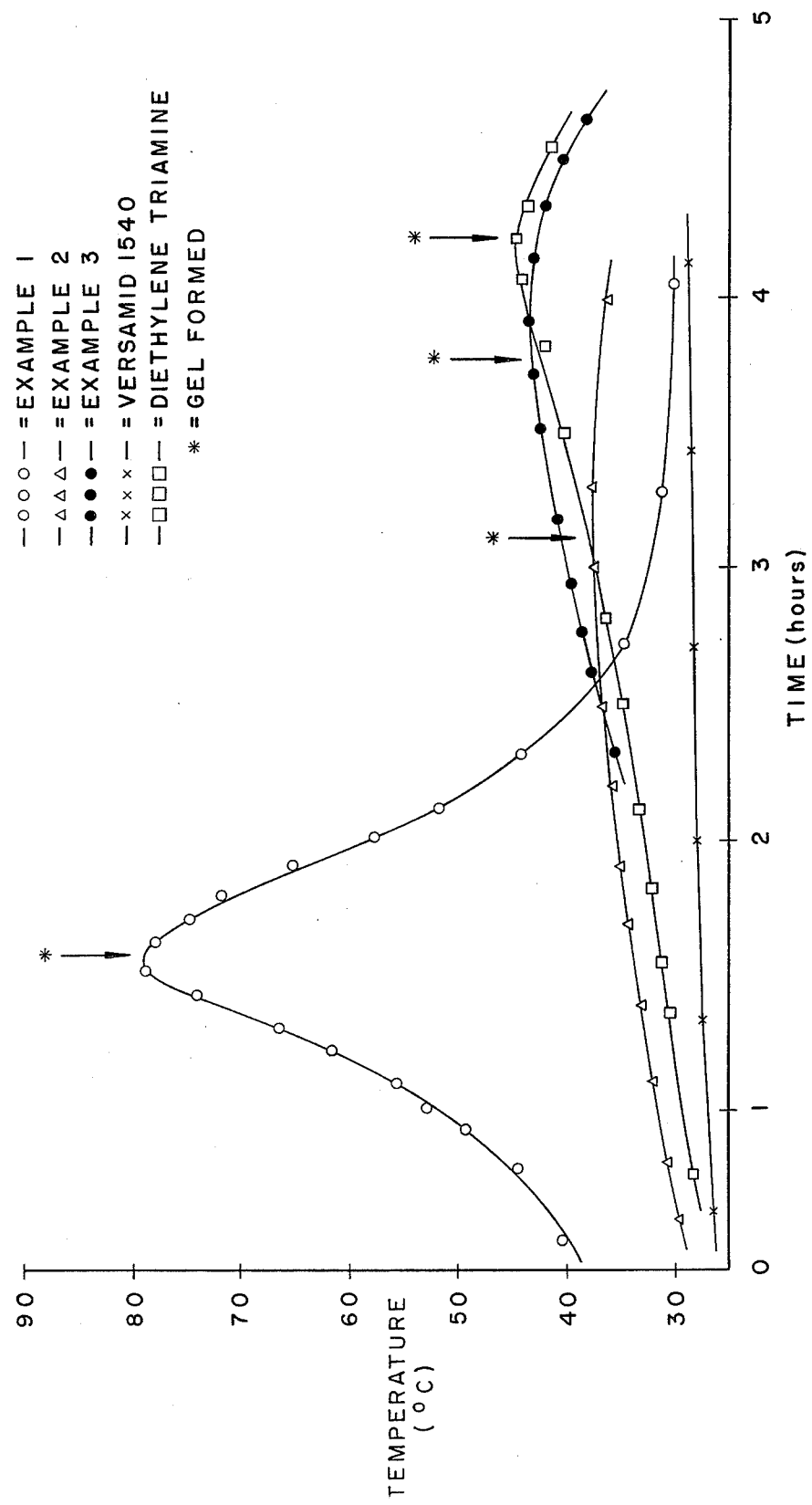

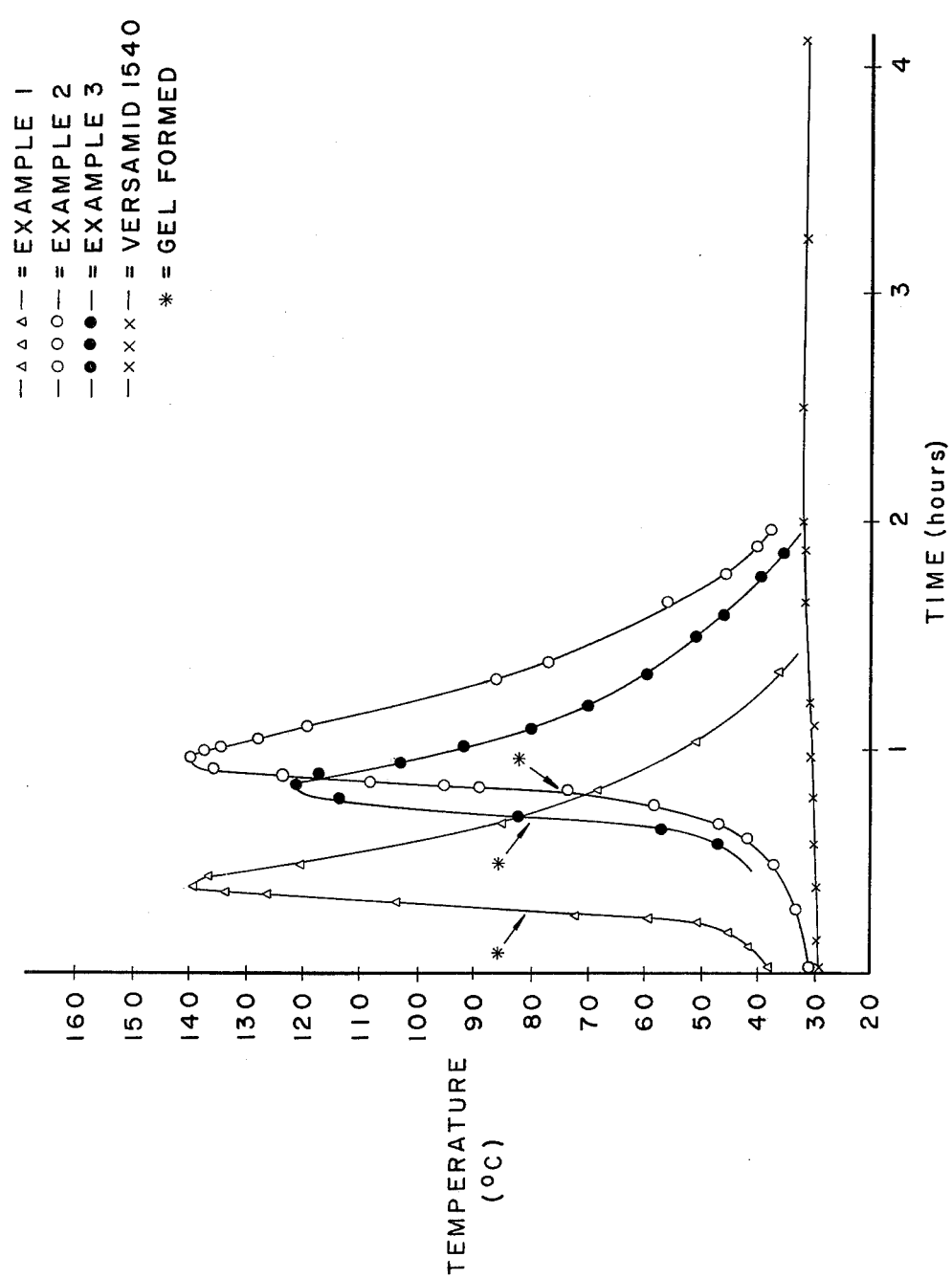
FIGURE-2-

POLYAMINOPOLYAMIDES

The present invention relates to novel polyaminopolyamides which are useful as epoxy curing agents, to epoxy resin compositions containing such polyaminopolyamides, and to methods for curing epoxy resins by means of such polyaminopolyamides.

Epoxy resins were first introduced commercially in the United States in about 1950 and since then their use has grown rapidly. Epoxy resins may be broadly defined as resinous intermediate materials which are characterized by the presence of the epoxy group,

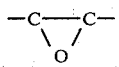

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides tertiary amines, and amine adducts. The novel polyaminopolyamide compounds of the present invention may be employed as the third type, namely the amine type, of epoxy curing agent.

According to the present invention, polyaminopolyamide compounds are provided which comprise the reaction product of at least one carboxylic acid anhydride selected from mono-, di-, and poly-anhydrides with at least one polyamine of the formula:

H$_2$N—R—(NH$_2$)$_x$ in an amount of at least about 2 moles per mole of carboxylic acid anhydride group wherein R is selected from an aromatic group containing from about 13 to about 34 carbon atoms; a cycloalkyl group containing from about 13 to about 34 carbon atoms; and an alkyl group containing from about 9 to about 25 carbon atoms, which may further contain at least one heteroatom selected from oxygen, nitrogen, and sulfur; and x is an integer of from about 2 to about 9, preferably from about 2 to about 5.

The mono-, di-, and poly-carboxylic acid anhydrides with which the polyamine compounds may be reacted to form the novel polyamino polyamides of the present invention include a wide variety of such anhydrides, and the invention is not, in fact, limited to any particular carboxylic acid anhydrides. Some useful examples of carboxylic acid anhydrides include maleic anhydride; succinic anhydride; n-hexenyl succinic anhydride; n-octenyl succinic anhydride; diisobutenyl succinic anhydride; nonenyl succinic anhydride; n-decenyl succinic anhydride; n-dodecenyl succinic anhydride; dodecenyl succinic anhydride; n-tetradecenyl succinic anhydride; n-hexadecenyl succinic anhydride; n-octadecenyl succinic anhydride; iso-octadencenyl succinic anhydride; n-eicosenyl succinic anhydride; n-docosenyl succinic anhydride; n-hexyl succinic anhydride; n-octyl succinic anhydride; n-decyl succinic anhydride; n-tetradecyl succinic anhydride; n-hexadecyl succinic anhydride; n-octadecyl succinic anhydride; n-eicosyl succinic anhydride; and n-docosyl succinic anhydride; phthalic anhydride; tetrahydrophthalic anhydride; hexahydrophthalic anhydride; methyltetrahydrophthalic anhydride; methylhexahydrophthalic anhydride; 5-norbornene-2,3-dicarboxylic anhydride; norbornane-2,3-dicarboxylic anhydride; methyl 5-norbornene-2,3-dicarboxylic anhydride; 1,8-napththalic anhydride; trimellitic anhydride; pyromellitic dianhydride; 3,3,4,4-benzophenone tetracarboxylic dianhydride; 1,2,3,4-cyclopentane tetracarboxylic acid dianhydride; 2,3,4,5-tetracarboxylic acid dianhydride of tetrahydrofuran; 1,8-dimethylbicyclo (2.2.2.) oct-7-ene-2,3,5,6-tetracarboxylic acid dianhydride; tetrachlorophthalic anhydride; tetrabromophthalic anhydride; 1,4,5,6,7,7-hexachloro-5 norbornene-2,3-dicarboxylic anhydride; cyclohexane-1,2-dicarboxylic anhydride; and the like.

Polyamines which may be employed to prepare the compounds of the invention may be broadly represented by the structural formula set forth above. Some useful examples of such polyamines include the following:

4-aminomethyl-1,8-octanediamine

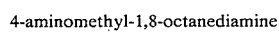

1,2,3-tris-(-3-aminopropoxy)propane

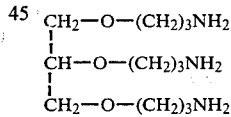

tetra-(-3-aminopropoxy)pentaerythritol

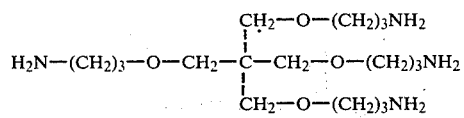

1,2,3,4,5,6-hexa-(-3-aminopropoxy)hexane

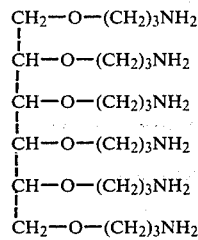

-continued bis-(-3-aminopropoxy)-N-(-3-aminopropyl)diethanolamine

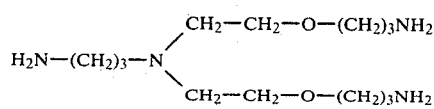

bis-(-3-aminopropoxy)-N-(-3-aminopropyl)diisopropanolamine

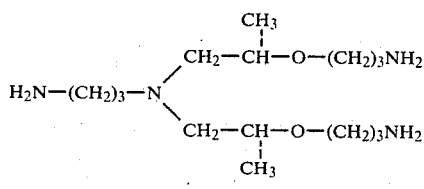

2,4-Bis-(-p-aminobenzyl)aniline

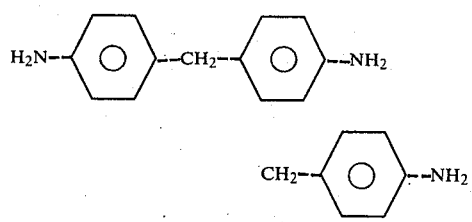

According to an embodiment of the present invention, the polyaminopolyamide compounds are selected from the group consisting of

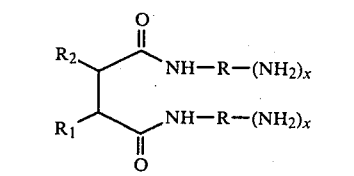

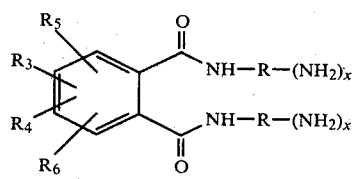

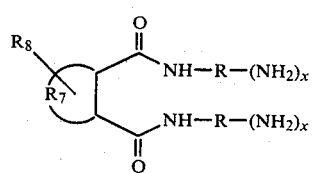

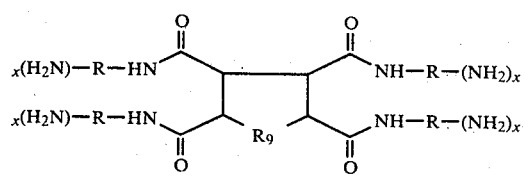

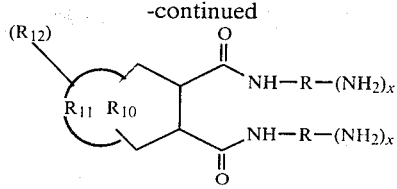

the reaction product of a polyamine of the formula:

$$H_2N-R-(NH_2)_x$$

where R and X have the values given above, in an amount of at least about 2 moles of polyamine per mole of carboxylic acid anhydride group, with an anhydride selected from the group consisting of: 1,8-naphthalic anhydride; pyromellitic dianhydride; 3,3,4,4-benzophenone tetracarboxylic dianhydride; 1,8-dimethylbicyclo-(2.2.2.)oct-7-ene-2,3,5,6-tetracarboxylic acid dianhydride; and cyclohexane-1,2-dicarboxylic anhydrides.

$R_1$ and $R_2$ are each independently selected from H, alkyl groups containing from 1 to about 150 carbon atoms, preferably from 1 to about 25 carbon atoms.

$R_3$, $R_4$, $R_5$, and $R_6$ are each independently selected from H, Cl, Br, an alkyl group containing from 1 to about 10 carbon atoms, preferably from 1 to about 5 carbon atoms, and the polyaminoamide moiety

where x is an integer of from about 2 to about 9, preferably from about 2 to about 5, with the proviso that no more than two of said $R_3$, $R_4$, $R_5$, and $R_6$ moieties may be said polyaminoamide moiety.

$R_7$ is selected from a divalent alkyl moiety containing 4 carbon atoms, and a divalent monoethylenically unsaturated moiety containing 4 carbon atoms.

$R_8$ is selected from H and a lower alkyl moiety containing from 1 to about 5 carbon atoms.

$R_9$ is selected from O and $CH_2$.

$R_{10}$ is selected from $CH_2$ and O.

$R_{11}$ is selected from a divalent alkyl moiety containing 2 carbon atoms and a divalent monoethylenically unsaturated moiety containing 2 carbon atoms.

$R_{12}$ is selected from Cl and Br.

The present invention also relates to the use of such compounds as epoxy curing agents and to epoxy resin compositions which contain 100 parts by weight of at least one epoxy resin and from about 15 parts to about 50 parts, preferably about 20 parts to about 40 parts, by weight of the polyaminopolyamide compounds of the invention. Such cured products have good flexibility, high heat distortion temperatures, and excellent solvent resistance.

In accordance with the present invention, a process is provided for the preparation of polyaminopolyamides by condensation of a corresponding mono-, di-, or polyanhydride compounds with polyamines of the formula $$H_2N-R-(NH_2)_x$$

where R and x have the value indicated above. While the condensation molar ratio of polyamine to carboxylic acid anhydride may vary from 1 to about 10, from about 2 to about 3 is preferred. According to the invention, at least about 2 moles of polyamine may be reacted per unit mole of carboxylic acid anhydride to maximize the amount of tetra- or higher order amine product. By means of such reaction, polyaminopolyamides may be produced in high yields. For instance, the condensation reaction may be easily understood by means of a representative example thereof, whereby one anhydride, namely phthalic anhydride, within the scope of the invention is reacted with the polyamine. The equation set forth below illustrates an embodiment of the invention but is not to be construed as a limitation thereof.

The corresponding reaction pathway is believed to occur as outlined in scheme 1.

The first step in this scheme is exothermic in nature, whereby the anhydride ring is opened to form a half-acid amide. During this step, a considerable amount of heat is evolved and viscous product results (in some cases solid is even observed). Upon heating, the acid group of the half-acid amide is further condensed to form a second amide linkage with water liberation.

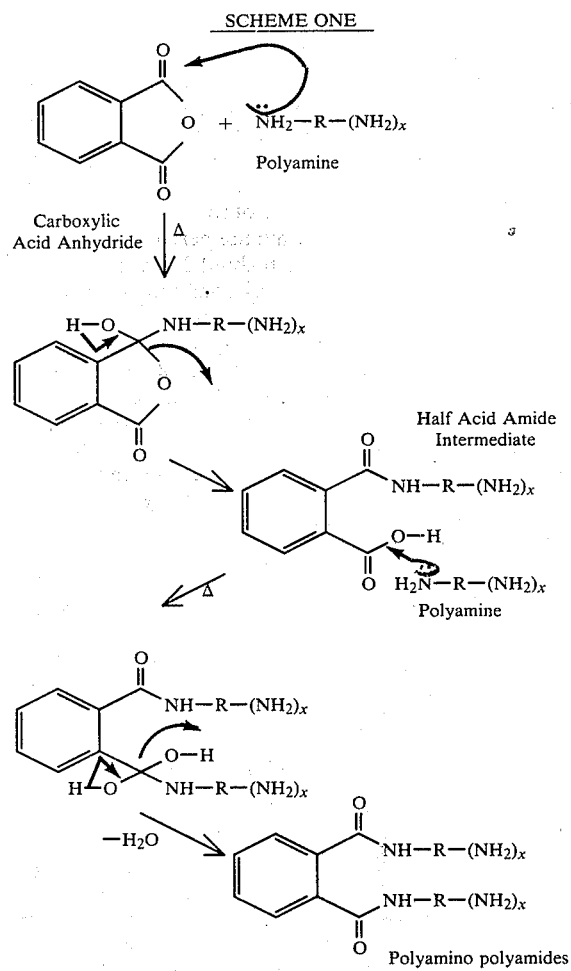

SCHEME ONE

One particularly important use for the novel compounds of the present invention is their use as epoxy curing agents for polyepoxides. The polyepoxides which can be cured at elevated temperatures using the amino compounds as herein described are those polyepoxides possessing at least two

groups. These groups may be terminal, i.e.,

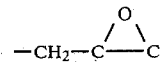

groups, or they may be in an internal position. However, especially desirable results can be obtained when the epoxy groups are terminal. The polyepoxides may be saturated or unsaturated, aliphatic, cycloaliphatic, aromatic, or heterocyclic, and may be substituted such as with hydroxyl groups, ether radicals, and the like. Further, the polyepoxides can be monomeric or polymeric. Such polyepoxides, and their preparation, are well known in the art.

The curing of the polyepoxides with the above-described polyaminopolyamide compound curing agents of the present invention may be accomplished by simply mixing the two components together. While the reaction between the two components may occur slowly at room temperature, improved results can be obtained if the mixture is heated to a temperature of from about 50° C. to about 280° C. for a period of time of from about 1 to about 12 hours and thereafter post-curing the reaction product for an additional period of time from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of about 140° C. to about 225° C. for an additional 2 hours or so.

In curing polyepoxides, it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel polyaminopolyamide compound curing agent by evaporation before and/or during the curing of such polyepoxide composition can be added to the polyepoxide to reduce its viscosity. Typical of such volatile liquid solvents are ketones, such as acetone, methyl ethyl ketone, and the like; ethers, such as ethyl acetate, butyl acetate, and the like; ether alcohols, such as methyl, ethyl, or butyl ethers of ethylene glycol; and chlorinated hydrocarbons, such as chloroform.

In addition to the use of the polyaminopolyamide compounds of the present invention as epoxy curing agents, many other uses can readily be envisioned by those skilled in the art. Thus, not only do the compounds of the present invention find utility as epoxy curing agents but such compositions can be employed as oil and fuel additive intermediates. Further, the polyamines may be employed for the formation of diisocyanate compositions for the incorporation into polyurethane compositions, and the compound may be further reacted to form novel and useful polyamides.

In order to more fully describe the preparation and use of the polyaminopolyamide compounds of the present invention, the following examples are given. However, such examples are presented for illustration only and are not to be construed as unduly limiting the scope of the present invention. Unless otherwise indicated, all parts and/or percentages given in these examples are by weight.

EXAMPLE 1

In a 2500 cc three-necked flask equipped with mechanical stirrer, Dean Stark trap, thermometer, dropping funnel, nitrogen purge, and heating mantle were charged 346 gm (2 moles) of 4-aminomethyl-1,8-octanediamine, along with 200 cc of toluene. The stirrer was turned on and 166 gm (1 mole) of methyltetrahydrophthalic anhydride dissolved in about 200 cc of toluene were added through the dropping funnel into the reaction flask. An exothermic reaction resulted and the addition rate was controlled so that the temperature was kept below 110° C. The contents in the reaction flask became quite viscous with some solid forming. After all the anhydride was added, the reaction mixture was heated to boiling (at about 114°–116° C.). Water was collected in the Dean Stark trap, and after 8 hours of reflux no further water was collected. The reaction mixture was then cooled to room temperature and the excess toluene was stripped away under vacuum (15–30 mm Hg) to give a liquid product. An IR spectrum indicated the absence of carboxylic acid anhydride and the presence of the corresponding polyaminopolyamide. A potentiometric titration of the tetraminodiamide product with 1 N HCl gave a neutralization equivalent of 8.28 milliequivalents of 1 N HCl per 1 gm of product. The theoretical value of the tetraminodiamide (MWT=494 g/mole) was calculated to be 8.10 milliequivalents of 1 N HCl per gm of product, which is in good agreement with the observed experiment value.

EXAMPLE 2

In a 2000 cc three-necked flask equipped with mechanical stirrer, Dean Stark trap, thermometer, dropping funnel, nitrogen purge, and heating mantle were charged 173 gm (1 mole) of 4-aminomethyl-1,8-octanediamine, along with 100 cc of toluene. The stirrer was turned on and 133 gm (0.5 mole) of dodecenyl succinic anhydride dissolved in 100 cc of toluene were added through the dropping funnel into the reaction flask. An exothermic reaction resulted and the addition rate was controlled so that the temperature was kept below 110° C. The contents in the reaction flask became quite viscous with some solid forming. After all the anhydride was added, the reaction mixture was heated to boiling (at about 114°–116° C.). Water was collected in the Dean Stark trap, and after 8 hours of reflux no further water was collected. The reaction mixture was then cooled to room temperature and the excess toluene was stripped away under vacuum (15–30 mm Hg) to give a liquid product. An IR spectrum indicated the absence of carboxylic acid anhydride and the presence of the corresponding polyaminopolyamide. A potentiometric titration of the tetraminodiamide product with 1 N HCl gave a neutralization equivalent of 6.90 milliequivalents of 1 N HCl per 1 gm of product. The theoretical value of the tetraminodiamide (MWT=594 g/mole) was calculated to be 6.73 milliequivalents of 1 N HCl per gm of product, which is in good agreement with the observed experiment value.

EXAMPLE 3

In a 1000 cc three-necked flask equipped with mechanical stirrer, Dean Stark trap, thermometer, dropping funnel, nitrogen purge, and heating mantle were charged 173 gm (1 mole) of 4-aminomethyl-1,8-octanediamine, along with 100 cc of toluene. The stirrer was turned on and 89 gm (0.5 mole) of nadic methyl anhydride dissolved in about 100 cc of toluene were added through the dropping funnel into the reaction flask. An exothermic reaction resulted and the addition rate was controlled so that the temperature was kept below 110° C. The contents in the reaction flask became quite viscous with some solid forming. After all the anhydride was added, the reaction mixture was heated to boiling (at about 114°–116° C.). Water was collected in the Dean Stark trap, and after 8 hours of reflux no further water was collected. The reaction mixture was then cooled to room temperature and the excess toluene was stripped away under vacuum (15–30 mm Hg) to give a liquid product. An IR spectrum indicated the absence of carboxylic acid anhydride and the presence of the corresponding polyaminopolyamide.

EXAMPLE 4

In a 1000 cc three-necked flask equipped with mechanical stirrer, Dean Stark trap, thermometer, nitrogen purge, and heating mantle were charged 130.3 gm (0.5 mole) of 1,2,3-tris-(-3-aminopropoxy)propane, and about 100 cc of toluene. The stirrer was turned on and 41.5 gm (0.25 mole) of methyltetrahydrophthalic anhydride dissolved in about 100 cc of toluene were added to the reaction flask over a 15-minute period. The reaction temperature exothermed from about 22° C. to 55° C. on adding the anhydride, and a viscous mixture resulted. The heat was turned on and the reaction mixture was heated to reflux (at a reaction temperature of 114°–116° C.). Water was collected in the Dean Stark trap. After 8 hours of reflux no further water was collected. The reaction mixture was then cooled to room temperature and the excess toluene was stripped away under vacuum (15–30 mm Hg) to give a liquid product. An IR spectrum indicated the absence of carboxylic acid anhydride and the presence of the corresponding polyaminopolyamide. A potentiometric titration of the tetraminodiamide product with 1 N HCl gave a neutralization equivalent of 6.20 milliequivalents of 1 N HCl per 1 gm of product. The theoretical value of the tetraminodiamide (MWT=674.8 g/mole) was calculated to be 5.93 milliequivalents of 1 N HCl per gm of product, which is in good agreement with the observed experiment value.

EXAMPLE 5

In a 1000 cc three-necked flask equipped with mechanical stirrer, Dean Stark trap, thermometer, nitrogen purge, and heating mantle were charged 189.1 gm (0.52 mole) of tetra-(-3-aminopropoxy)pentaerythritol and 100 cc of xylenes. The stirrer was turned on and 43.2 gm (0.26 mole) of methyltetrahydrophthalic anhydride dissolved in 100 cc of xylenes were added to the reaction flask. An exotherm resulted and the temperature increased from 21° C. to 55° C. while the reaction mass became quite viscous and formed some solid. The heating mantle was adjusted so that the xylenes refluxed (reaction temperature was 146°–148° C.). Water was collected in the Dean Stark trap. After 3 hours of reflux no further water was collected. A total of 4.4 cc of water was in the Dean Stark trap. The reaction mixture was then cooled to room temperature and the excess xylenes were stripped away under vacuum (15–30 mm Hg) to give a liquid product. An IR spectrum indicated the absence of carboxylic acid anhydride and the presence of the corresponding polyaminopolyamide. A potentiometric titration of the hexaminodiamide product with 1 N HCl gave a neutralization equivalent of 7.04 milliequivalents of 1 N HCl per 1 gm of product. The theoretical value of the hexaminodiamide (MWT=876.3 g/mole) was calculated to be 6.84 milliequivalents of 1 N HCl per gm of product, which is in good agreement with the observed experiment value.

EXAMPLE 6

In a 1000 cc three-necked flask equipped with mechanical stirrer, Dean Stark trap, thermometer, nitrogen purge, and heating mantle were charged 154.9 gm (0.29 mole) of 1,2,3,4,5,6-hexa-(-3-aminopropoxy)hexane and 100 cc of xylenes. The stirrer was turned on and 24.1 gm (0.14 mole) of methyltetrahydrophthalic anhydride dissolved in 100 cc of xylenes were added to the reaction flask. An exotherm resulted and the temperature increased from 20° C. to 42° C. while the reaction mass became quite viscous. The heating mantle was adjusted so that the xylenes refluxed (reaction temperature was 144°–148° C.). Water was collected in the Dean Stark trap. After 3½ hours of reflux no further water was collected. The reaction mixture was then cooled to room temperature and the excess xylenes were stripped away under vacuum (15–30 mm Hg) to give a viscous liquid product. An IR spectrum indicated the absence of carboxylic acid anhydride and the presence of the corresponding polyaminopolyamide. A potentiometric titration of the decaminodiamide product with 1 N HCl gave a neutralization equivalent of 7.90 milliequivalents of 1 N HCl per 1 gm of product. The theoretical value of the decaminodiamide (MWT=1196.34 g/mole) was calculated to be 8.35 milliequivalents of 1 N HCl per gm of product, which is in good agreement with the observed experiment value.

EXAMPLE 7

In a 1000 cc three-necked flask equipped with mechanical stirrer, Dean Stark trap, thermometer, nitrogen purge, and heating mantle were charged 126.9 gm (0.48 mole) of 1,2,3-tris-(-3-aminopropoxy)propane, and about 100 cc of xylenes. The stirrer was turned on and 38.34 gm (0.12 mole) of 3,3,4,4-benzophenonetetracarboxylic dianhydride were washed into the flask along with 100 cc of xylenes. No initial exotherm was observed. On heating, a solid mass precipitated from the xylenes. After about 4 hours of refluxing xylenes (reaction temperature 146°–150° C.), water stopped distilling over in the Dean Stark trap. The reaction mixture was then cooled down and the resulting polyaminopolyamide precipitated as a solid. An IR spectrum of the solid indicated the absence of carboxylic acid anhydride and the presence of the corresponding polyaminopolyamide.

EXAMPLE 8

To three beakers each containing 100 parts of epoxy resin based on Eponex 1513, a diglycidyl ether of hydrogenated bisphenol A (n=0.2, WPE=233-238) available from Shell Chemical Co., of the formula:

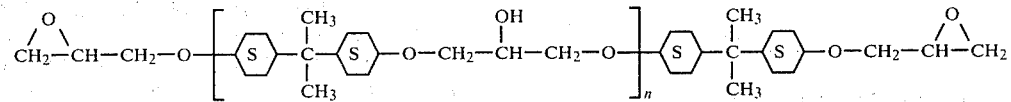

were added the corresponding parts of the tetraminodiamide prepared in Example 1: 30.0 parts, 33.0 parts, 36.0 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the Table below.

TABLE 1

| GLASS TRANSITION TEMPERATURE FOR TETRAMINODIAMIDE OF EXAMPLE 1 | | |
|---|---|---|
| Entry | PHR | TG (°C.) |
| 1 | 30 | 91.7 |
| 2 | 33 | 96.2 |
| 3 | 36 | 97.2 |

EXAMPLE 9

To three beakers each containing 100 parts of epoxy resin based on diglycidyl ether of hydrogenated bisphenol A (n=0.2, WPE=233-238) were added the corresponding parts of the tetraminodiamide prepared in Example 2: 31.1 parts, 31.6 parts, 32.1 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the Table below.

TABLE 2

| GLASS TRANSITION TEMPERATURE FOR TETRAMINODIAMIDE OF EXAMPLE 2 | | |
|---|---|---|
| Entry | PHR | TG (°C.) |
| 1 | 31.1 | 75.4 |
| 2 | 31.6 | 77.0 |
| 3 | 32.1 | 75.4 |

EXAMPLE 10

To four beakers each containing 100 parts of epoxy resin based on diglycidyl ether of hydrogenated bisphenol A (n=0.2, WPE=233-238) were added the corresponding parts of 4-aminomethyl-1,8-octanediamine: 13.3 parts, 13.8 parts, and 14.8 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the Table below.

TABLE 3
GLASS TRANSITION TEMPERATURE FOR 4-AMINOMETHYL-1,8-OCTANEDIAMINE

| Entry | PHR | TG (°C.) |
|---|---|---|
| 1 | 13.3 | 61.5 |
| 2 | 13.8 | 73.1 |
| 3 | 14.3 | 73.1 |
| 4 | 14.8 | 75.4 |

To provide comparison, the thermal data for 4-aminomethyl-1,8-octanediamine with corresponding tetraminodiamides methyltetrahydrophthalic anhydride (Example 1) and dodecenyl succinic anhydride (Example 2) are shown in the Table below for Eponex 1513 resin:

TABLE 4
COMPARISON OF CURING AGENTS WITH EPONEX 1513 RESIN

| Entry | Curing Agent | PHR | MAX TG (°C.) |
|---|---|---|---|
| 1 | Example 1 | 36.0 | 97.2 |
| 2 | Example 2 | 31.6 | 77.0 |
| 3 | 4-aminomethyl-1,8-octanediamine | 14.8 | 75.4 |

EXAMPLE 11

To five beakers each containing 100 parts of epoxy resin based on diglycidyl ether of hydrogenated bisphenol A (n=0.2, WPE=233-238) were added the corresponding parts of novel polyaminoamides prepared in prior examples, along with commercially available curing agents for comparison: 26.3 PHR tetraminodiamide of Example 1, 31.6 parts of tetraminodiamide of Example 2, 46.5 parts of 4-aminomethyl-1,8-octanediamine, 55.0 parts of Versamid 1540, a reaction product of a dimer acid and a polyethylene polyamine available from Henkel Corporation and 9.0 parts diethylene triamine. After mixing each beaker thoroughly for 2 minutes at 25° C., the temperature and time was observed for each mixture to determine room temperature cure rate. FIG. 1 gives a plot of this data and the Table below gives the gel time and peak exotherm.

TABLE 5
COMPARISON OF CURE DATA WITH EPONEX 1513

| Entry | Curing Agent | PHR | Gel Time (hrs) | Peak Exotherm (°C.) |
|---|---|---|---|---|
| 1 | Example 1 | 26.3 | 1.50 | 77 |
| 2 | Example 2 | 31.6 | 3.04 | 37 |
| 3 | 4-aminomethyl-1,8-octanediamine | 12.3 | 3.80 | 43 |
| 4 | Versamid 1540 | 55.0 | >12 | None |
| 5 | Diethylenetriamine | 9.0 | 4.2 | 44 |

EXAMPLE 12

To five beakers each containing 100 parts of epoxy resin based on diglycidyl ether of hydrogenated bisphenol A (n=0.2, WPE=233-238) were added the corresponding parts of novel polyaminoamides prepared in prior examples along with the commercially available curing agents: 26.3 PHR tetraminodiamides of Example 1, 31.6 parts of tetraminodiamides of Example 2, 12.3 parts of 4-aminomethyl-1,8-octanediamine, 9 parts of diethylenetriamine, and 55.0 parts of Versamid 1540 (Henkel Corporation). After mixing each beaker thoroughly for 2 minutes at 25° C., a thin film was made of about 10 mils for each of the mixtures and the relative cure rate at room temperature, was observed over several days. The tack-free relative rate of thin films was as follows: tetraminodiamide (Example 1)>>tetraminodiamide (Example 2)>4-aminomethyl-1,8-octanediamine, diethylene triamine>Versamid 1540. Furthermore, the tetraminodiamide (Example 1) sample was tack-free within 12 hours without any carbonate formation observed. In contrast, the Versamid sample took several days to cure with notable carbonate formation occurring.

EXAMPLE 13

To three beakers each containing 100 parts of epoxy resin based on Epon 828, a diglycidyl ether of bisphenol A (n=0.2, WPE=185-195) available from Shell Chemical Co., of the formula:

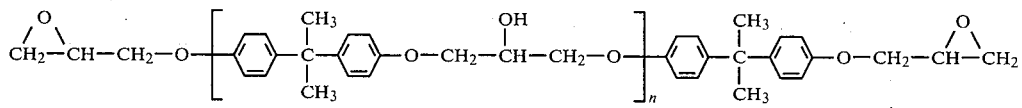

were added the corresponding parts of the tetraminodiamide prepared in Example 1: 34.0 parts, 35.0 parts, and 36.0 parts. After mixing each beaker thoroughly for 2 minutes and centrifuging at a speed of 3000 rpm, these resin mixturs were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the Table below:

TABLE 6
GLASS TRANSITION TEMPERATURE FOR TETRAMINODIAMIDE OF EXAMPLE 1

| Entry | PHR | TG (°C.) |
|---|---|---|
| 1 | 34 | 118.2 |
| 2 | 35 | 126.7 |
| 4 | 36 | 137.2 |

EXAMPLE 14

To four beakers each containing 100 parts of epoxy resin based on diglycidyl ether of bisphenol A (n=0.2, WPE=185-195) were added the corresponding parts of tetraminodiamide prepared in Example 4: 42.6 parts, 43.6 parts, and 44.6 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the following Table.

TABLE 7

GLASS TRANSITION TEMPERATURE FOR TETRAMINODIAMIDE OF EXAMPLE 4

| Entry | PHR | TG (°C.) |
|---|---|---|
| 1 | 41.6 | 88.3 |
| 2 | 42.6 | 90.8 |
| 3 | 43.6 | 98.3 |
| 4 | 44.7 | 94.8 |

EXAMPLE 15

To four beakers each containing 100 parts of epoxy resin based on diglycidyl ether of bisphenol (n=0.2, WPE=185–195) were added the corresponding parts of hexaminodiamide prepared in Example 5: 37.0 parts, 38.0 parts, 34.0 parts, and 40.0 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. the crosslinked products had glass transition temperatures measured with a differential scanning calorimeter (Perkin Elmer Model DSC-2) as are summarized in the Table below.

TABLE 8

GLASS TRANSITION TEMPERATURE FOR HEXAMINODIAMIDE OF EXAMPLE 5

| Entry | PHR | TG (°C.) |
|---|---|---|
| 1 | 37.0 | 104.8 |
| 2 | 38.0 | 107.8 |
| 3 | 39.0 | 107.3 |
| 4 | 40.0 | 105.8 |

EXAMPLE 16

To four beakers each containing 100 parts of epoxy resin based on diglycidyl ether of bisphenol A (n=0.2, WPE=185–195) were added the corresponding parts of decaminodiamide prepared in Example 6: 33.0 parts, 34.0 parts, 35.0 parts, and 36 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the Table below.

TABLE 9

GLASS TRANSITION TEMPERATURE FOR DECAMINODIAMIDE OF EXAMPLE 6

| Entry | PHR | TG (°C.) |
|---|---|---|
| 1 | 33 | 129.5 |
| 2 | 34 | 130.8 |
| 3 | 35 | 131.0 |
| 4 | 36 | 121.8 |

EXAMPLE 17

To four beakers each containing 100 parts of epoxy resin based on diglycidyl ether of bisphenol A (n=0.2, WPE=185–195) were added the corresponding parts of novel polyaminopolyamides prepared in prior examples along with commercially available curing agents: Example 1, 27.3 parts of tetraminodiamide; Example 2, 31.6 parts of tetraminodiamide, 46.5 parts of 4-aminomethyl-1,8-octanediamine, and 55.0 parts of Versamid 1540 (Henkel Corporation). After mixing each beaker thoroughly for 2 minutes at 25° C., the temperature and time were observed to determine room temperature cure rate. FIG. 2 gives a plot of this data and Table 2 below gives the gel time and peak exotherm data.

TABLE 10

COMPARISON OF CURE RATE DATA FOR EPON 828

| Entry | Curing Agent | PHR | Gel Time (hrs) | Peak Exotherm (°C.) |
|---|---|---|---|---|
| 1 | Example 1 | 27.2 | 0.42 | 133 |
| 2 | Example 2 | 31.6 | 0.83 | 136 |
| 3 | 4-aminomethyl-1,8-octanediamine | 12.3 | 0.76 | 119 |
| 4 | Versamid 1540 | 55.0 | 3.55 | 32 |

The preceding examples clearly show the preparation of the novel compound(s) of the present invention. Furthermore, Examples 8 through 17 demonstrate the use of polyaminopolyamides as epoxy curing agents, both for Epon 828 and Eponex 1513 type resins. More specifically, the high degree of primary amine functionality in these novel polyaminopolyamides provide unique characteristics to curing and cured epoxy systems, especially in the Eponex type epoxy resins. Table 4 shows that tetraminodiamide (Entry 1) provides enhanced thermal properties over the trifunctional starting material (Entry 3). In addition, the pot life data in Example 11, Table 5, and FIG. 1 demonstrates the advantage of enhanced cure rate with Eponex 1513 resins. The tetraminodiamide (Entry 1) has a pot life which is at least one-tenth that of conventional type polyamides such as Versamid 1540 (Entry 4), and even one-third as long as diethylenetriamine (Entry 5). The tack-free relative rate of thin films with Eponex 1513 is less than that of Versamid 1540 by at least 24 hours, and no adverse carbonation is observed for the polyaminopolyamide cured products as compared to the Versamid 1540 cured product (see Example 12).

This further rate of cure allows less chance for carbonate formation and discoloration of the cured product which, of course, is critical in certain coating applications, not to mention the real energy efficient advantages for potential Eponex 1513 in the weatherability area. The cure rate of polyaminopolyamides in Epon 828 type epoxy resins is also enhanced over conventional polyamides, such as Versamid 1540, by a factor of about 9 (see Example 17, Table 10, and FIG. 2).

What is claimed is:

1. Polyaminopolyamide compounds which comprise the reaction product of at least one carboxylic acid anhydride selected from mono-, di-, and poly-anhydrides with at least one polyamine of the formula:

$$H_2N-R-(NH_2)_x$$ 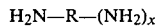

in an amount of at least about 2 moles of polyamine per mole of carboxylic acid anhydride group; wherein R is selected from an aromatic group containing from about 13 to about 34 carbon atoms; a cycloalkyl group containing from about 13 to about 34 carbon atoms; and an alkyl group containing from about 9 to about 25 carbon atoms, which may further contain at least one heteroatom selected from oxygen, nitrogen, and sulfur; and x is an integer of from about 2 to about 9.

2. The polyaminopolyamide compounds of claim 1, wherein said carboxylic acid anhydride is selected from maleic anhydride; succinic anhydride; n-hexenyl succinic anhydride; n-octenyl succinic anhydride; diisobutenyl succinic anhydride; nonenyl succinic anhydride; n-decenyl succinic anhydride; n-dodecenyl succinic anhydride; dodecenyl succinic anhydride; n-tetradecenyl succinic anhydride; n-hexadecenyl succinic anhydride; n-octadecenyl succinic anhydride; iso-octadencenyl succinic anhydride; n-eicosenyl succinic anhydride; n-docosenyl succinic anhydride; n-hexyl succinic anhydride; n-octyl succinic anhydride; n-decyl succinic anhydride; n-tetradecyl succinic anhydride; n-hexadecyl succinic anhydride; n-octadecyl succinic anhydride; n-eicosyl succinic anhydride; and n-docosyl succinic anhydride; phthalic anhydride; tetrahydrophthalic anhydride; hexahydrophthalic anhydride; methyltetrahydrophthalic anhydride; methylhexahydrophthalic anhydride; norbornane-2,3-dicarboxylic anhydride; 5-norbornane-2,3-dicarboxylic anhydride; methyl 5-norbornene-2,3-dicarboxylic anhydride; 1,8-naphthalic anhydride; trimellitic anhydride; pyromellitic dianhydride; 3,3,4,4-benzophenone tetracarboxylic dianhydride; 1,2,3,4-cyclopentone tetracarboxylic acid dianhydride; 2,3,4,5-tetracarboxylic acid dianhydride of tetrahydrofuran; 1,8-dimethylbicyclo (2.2.2.) oct-7-ene-2,3,5,6-tetracarboxylic acid dianhydride; tetrachlorophthalic anhydride; tetrabromophthalic anhydride; 1,4,5,6,7,7-hexachloro-5 norbornene-2,3-dicarboxylic anhydride; and cyclohexane-1,2 dicarboxylic anhydride.

3. The polyaminopolyamide compounds of claim 1, wherein said polyamine is selected from 4-aminomethyl-1,8-octane-diamine; 1,2,3-tris-(-3-aminopropoxy)propane; tetra-(-3-aminopropoxy)-pentaerythritol; 1,2,3,4,5,4-hexa-(-3-aminopropoxy)hexane; Bis-(-3-aminopropoxy)-N-(-3-aminopropyl) diethanolamine; and 2,4-Bis-(-p-aminobenzyl)aniline.

4. A polyaminopolyamide compound selected from the group consisting of

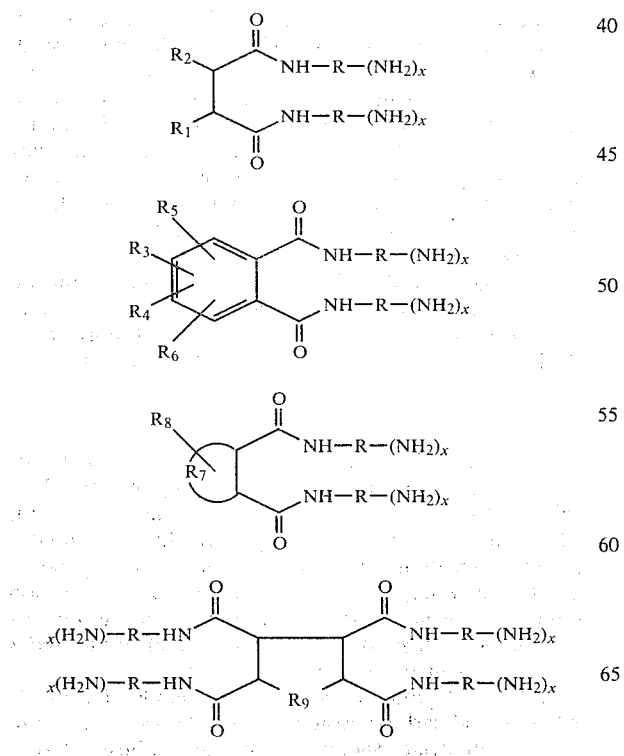

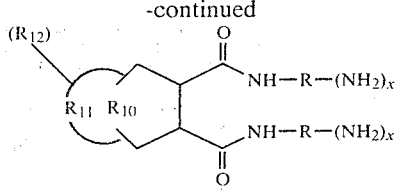

the reaction product of a polyamine of the formula:

$$H_2N—R—(NH_2)_x$$

provided in said reaction product in an amount of at least about 2 moles of polyamine per mole of carboxylic acid anhydride group, with an anhydride selected from the group consisting of 1,8-naphthalic anhydride; pyromellitic dianhydride; 3,3,4,4-benzophenone tetracarboxylic dianhydride; 1,8-dimethylbicyclo-(2.2.2.)oct-7-ene-2,3,5,6-tetracarboxylic acid dianhydride; and cyclohexane-1,2-dicarboxylic anhydrides, R is selected from an alkyl group containing from about 9 to about 25 carbon atoms; an aromatic group containing from about 13 to about 34 carbon atoms; a cycloalkyl group containing from about 13 to about 34 carbon atoms; and an alkyl group containing from about 9 to about 25 carbon atoms and further containing at least one heteroatom selected from oxygen, nitrogen, and sulfur; and x is an integer of from about 2 to about 9, $R_1$ and $R_2$ are each independently selected from H, alkyl groups containing from 1 to about 150 carbon atoms, $R_3$, $R_4$, $R_5$, and $R_6$ are each independently selected from H, Cl, Br, an alkyl group containing from 1 to about 10 carbon atoms, and the polyaminoamide moiety $$\overset{O}{\underset{\|}{C}}—NH—R—(NH_2)_x$$

where x is an integer of from about 2 to about 9, with the proviso that no more than two of said $R_3$, $R_4$, $R_5$, and $R_6$ moieties may be said polyaminoamide moiety, $R_7$ is selected from a divalent alkyl moiety containing 4 carbon atoms, and a divalent monoethylenically unsaturated moiety containing 4 carbon atoms, $R_8$ is selected from H and a lower alkyl moiety containing from 1 to about 5 carbon atoms, $R_9$ is selected from O and $CH_2$, $R_{10}$ is selected from $CH_2$ and O, $R_{11}$ is selected from a divalent alkyl moiety containing 2 carbon atoms and a divalent monoethylenically unsaturated moiety containing 2 carbon atoms, $R_{12}$ is selected from Cl and Br.

5. An epoxy resin composition comprising an epoxy resin and at least one epoxy resin curing agent which comprises the reaction product of at least one carboxylic acid anhydride selected from mono-, di-, and polyanhydrides with at least one polyamine of the formula:

$$H_2N—R—(NH_2)_x$$

in an amount of at least about 2 moles of polyamine per mole of carboxylic acid group; wherein R is selected from an aromatic group containing from about 13 to about 34 carbon atoms; a cycloalkyl group containing from about 13 to about 34 carbon atoms; and an alkyl group containing from about 9 to about 25 carbon atoms, which may further contain at least one heteroatom selected from oxygen, nitrogen, and sulfur; and x is an integer of from about 2 to about 9.

6. The curable epoxy resin composition of claim 5, wherein said epoxy resin is selected from the polyepoxides having at least two

groups.

7. The epoxy resin composition of claim 6, wherein said

groups are terminal groups.

8. The epoxy resin composition of claim 7, wherein said epoxy resin is a diglycidyl ether of bis-phenol.

9. In a method for curing an epoxy resin composition comprising incorporating an epoxy resin curing agent into an epoxy resin and heating the combination of the epoxy resin and the epoxy curing agent, the improvement which comprises said epoxy resin curing agent comprising the reaction product of at least one carboxylic acid anhydride selected from mono-, di-, and polyanhydrides with at least one polyamine of the formula:

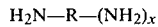

in an amount of at least about 2 moles of polyamine per mole of carboxylic acid anhydride group; wherein R is selected from an aromatic group containing from about 13 to about 34 carbon atoms; a cycloalkyl group containing from about 13 to about 34 carbon atoms; and an alkyl group containing from about 9 to about 25 carbon atoms, which may further contain at least one heteroatom selected from oxygen, nitrogen, and sulfur; and x is an integer of from about 2 to about 9.

* * * * *